United States Patent [19]

Dawkins

[11] Patent Number: 5,169,815
[45] Date of Patent: Dec. 8, 1992

[54] CHROMIUM-CONTAINING COMPLEX POLYMERIZATION CATALYST

[75] Inventor: Gordon M. Dawkins, Beuvry, France
[73] Assignee: BP Chemicals Limited, London, England
[21] Appl. No.: 574,641
[22] Filed: Aug. 29, 1990

[30] Foreign Application Priority Data

Sep. 4, 1989 [GB] United Kingdom ................. 8919925

[51] Int. Cl.$^5$ ............................................. C08F 4/69
[52] U.S. Cl. .................................. 502/152; 502/117; 526/129; 526/170
[58] Field of Search .............................. 502/152, 117

[56] References Cited

U.S. PATENT DOCUMENTS

| | | | |
|---|---|---|---|
| 3,666,743 | 5/1972 | Bower | 526/130 |
| 3,705,916 | 12/1972 | Bower | 526/130 |
| 3,752,795 | 8/1973 | Boone | 526/114 |
| 3,756,998 | 9/1973 | Karapinka | 526/130 |
| 3,806,500 | 4/1974 | Karol | 502/152 X |
| 3,836,595 | 9/1974 | Johnson et al. | 260/683.15 D |
| 3,840,508 | 10/1974 | Ballard et al. | 526/130 |
| 3,844,975 | 10/1974 | Karol | 502/117 X |
| 3,847,957 | 11/1974 | Boone | 526/114 |
| 3,875,132 | 4/1975 | Kruse | 526/170 |
| 3,876,554 | 4/1975 | Pullukat | 252/428 |
| 3,879,368 | 4/1975 | Johnson | 502/117 X |
| 3,884,832 | 5/1975 | Pullukat et al. | 252/429 C |
| 3,926,782 | 12/1975 | Plank et al. | 208/135 |
| 3,928,304 | 12/1975 | Pullukat | 260/94.9 D |
| 3,941,761 | 3/1976 | Pullukat et al. | 260/94.9 D |
| 3,976,632 | 8/1976 | Silap | 526/113 |
| 4,077,904 | 3/1978 | Noshay et al. | 502/152 |
| 4,086,408 | 4/1978 | Karol et al. | 502/152 X |
| 4,086,409 | 4/1978 | Karol et al. | 502/152 X |
| 4,147,849 | 4/1979 | Licu et al. | 526/113 |
| 4,153,576 | 5/1979 | Karol et al. | 502/152 |
| 4,303,770 | 12/1981 | Pollukat et al. | 526/96 |
| 4,359,562 | 11/1982 | Stein et al. | 526/129 |
| 4,435,314 | 3/1984 | van de Leemput et al. | 502/154 |
| 4,450,098 | 5/1984 | van de Leemput et al. | 502/107 |
| 4,458,028 | 7/1984 | van de Leemput et al. | 502/104 |
| 4,504,371 | 3/1985 | Cirjak et al. | 204/158 R |
| 4,587,227 | 5/1986 | Smith et al. | 502/153 |

FOREIGN PATENT DOCUMENTS

| | | |
|---|---|---|
| 26041 | 4/1981 | European Pat. Off. |
| 3030916 | 4/1982 | Fed. Rep. of Germany |
| 1253063 | 11/1971 | United Kingdom |
| 1264393 | 2/1972 | United Kingdom |
| 1298220 | 11/1972 | United Kingdom |
| 1317734 | 5/1973 | United Kingdom |

OTHER PUBLICATIONS

B. L. Shapiro (ed) 'Organometallic Compounds' 1983 Texas A&M Univ., pp. 493-499, paper by R. T. Edidium et al., "The Synthesis Structure and Reaction of Sinuclear Compounds Containing Early and Late Transaction Metals".
Madach et al. Chem. Ber. 113, 2675-2685 (1980).
Herrmann et al. Journal of Organometallic Chemistry 273 (1984) pp. 221-232.
Journal of Applied Polymer Science, vol. 7, pp. 347-355 (1963).
Miyaki et al., Angew. Chem. Internat. Ed. 8 (1969) pp. 520-521.
Renant et al., Journal of Organometallic Chemistry, 150 (1978) C9-C10.
Journal of Organometallic Chemistry, 157 (1978) pp. 239-241.

Primary Examiner—Patrick P. Garvin
Attorney, Agent, or Firm—Brooks, Haidt, Haffner & Delahunty

[57] ABSTRACT

The present invention relates to an olefin polymerization catalyst obtainable by depositing on a dry inorganic oxide support a monocuclear chromium complex to produce a catalyst precursor and thereafter by thermally activating the said catalyst precursor. The catalyst is characterized in that the mononuclear chromium complex is representable by the general formula:

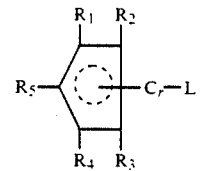

wherein:
the cyclopentadienyl ligand is substituted with 4 or 5 hydrocarbon groups containing 1 to 3 carbon atoms,
L is either a four or five-substituted cyclopentadienyl ligand, or $(CO)_3R$ in which R is H, methyl or ethyl.

The catalyst is used for polymerizing olefins, particularly ethylene optionally with $C_3$-$C_8$ alpha-olefins. It produces polyolefins having a relatively high molecular weight and a broad molecular weight distribution.

9 Claims, No Drawings

CHROMIUM-CONTAINING COMPLEX POLYMERIZATION CATALYST

The present invention relates to an olefin polymerisation catalyst and a precursor for forming the catalyst and to a process for producing polyolefins using the catalyst and polymers obtainable by the process.

The use of mononuclear chromium complexes for the polymerisation of olefins is known. For example, British Patent Specification 1253063 discloses a process for the polymerisation of ethylene comprising contacting ethylene, optionally in the presence of hydrogen, with a catalytic amount of bis(cyclopentadienyl) chromium (II) adsorbed on an inorganic oxide at a temperature and pressure sufficient to initiate the polymerisation reaction. U.S. Pat. No. 3,806,500 discloses a process for polymerising ethylene with a catalyst comprising a pi-bonded chromium compound (e.g. bis(cyclopentadienyl) chromium (II)) deposited on an activated support which catalyst is thermally aged before contacting with the ethylene by heating at a temperature of about 135° to 900° C. in an inert atmosphere for a period of time sufficient to allow for the removal of at least some of the ligands from the chromium compound. U.S. Pat. No. 3,844,975 discloses the homopolymerisation of ethylene or the copolymerisation of ethylene with other alpha-olefins using as a catalyst cyclopentadienyl chromium tricarbonyl hydride supported on an activated silica and/or alumina support, the catalyst being thermally aged in an inert atmosphere prior to contact with the monomer(s). In each of the patents it is suggested that the catalyst can comprise a substituted cyclopentadienyl ligand. However, none of the patents contains a specific example which utilizes a compound containing a substituted cyclopentadienyl ligand.

Polymers produced using monochromium catalysts having unsubstituted cyclopentadienyl ligands, e.g. bis (cyclopentadienyl) chromium (II), generally have a relatively low molecular weight, a narrow molecular weight distribution (Mw/Mn), and a low melt flow ratio.

It has now been found that certain mononuclear chromium complexes having a substituted cyclopentadienyl ligand, when supported on inorganic oxide and thermally activated, can be used as a catalyst for the polymerization of olefins, particularly the homopolymerization of ethylene and the copolymerization of ethylene with one or more $C_3$ to $C_8$ alpha-olefins. Unexpectedly, the supported and thermally activated catalyst can be used to produce polymers having relatively broad molecular weight distributions, which can be asymmetric, e.g. with a high molecular weight tail. Also, the molecular weight of the polymer can be partially controlled during the polymerization process by using hydrogen. The catalyst can therefore produce polymers having a relatively broad molecular weight distribution with a high molecular weight which polymers generally have good extrusion properties in that they have relatively low viscosities at high shear rates. They may also have relatively high stress crack resistance. Such polymers are consequently particularly suitable for applications such as the production of blow moulded articles, pipe and tough film. In particular, the catalyst according to the present invention can be used to produce high density polyethylene having a molecular weight distribution (Mw/Mn) in the range 8 to 20.

More particularly, the high density polyethylene (density about from 950 to 97 kg/m$^3$) thus produced may present a very particular combination of melt index, melt flow ratio and molecular weight distribution. With a melt index (ASTM D 1238 Condition E) of about from 0.05 to 0.5 dg/min and a melt flow ratio (ratio between melt indexes according to ASTM D 1238 Condition F and Condition E) of about from 60 to 100, the high density polyethylene may have a relatively broad molecular weight distribution, since the value of the ration Mw/Mn may be from 10 to 16, preferably from 12 to 15. The unusual relation between the values of the melt flow ratio and the molecular weight distribution may suggest that the said distribution is asymmetric. Furthermore, the unsaturation level in the high density polyethylene can be very low, since the content of vinyl groups per 1000 carbon atoms can be lower than or equal to about 0.3.

According to the present invention, an olefin polymerisation catalyst obtainable by depositing on a dry inorganic oxide support a mononuclear chromium complex to produce a catalyst precursor and thereafter by thermally activating the said catalyst precursor, and preferably so obtained, is characterised in that the mononuclear chromium complex is representable by the general formula:

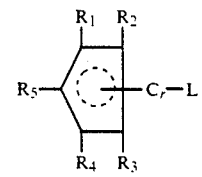

wherein
four of the groups $R_1$ to $R_5$ of the substituted cyclopentadienyl ligand are individually selected from the group consisting of methyl, ethyl, isopropyl and n-propyl and the fifth is selected from the group consisting of methyl, ethyl, n-propyl, isopropyl and hydrogen, L is (a) a cyclopentadienyl ligand substituted with four or five groups individually selected from methyl, ethyl, isopropyl and n-propyl or (b) (CO)$_3$ R in which R is H, methyl or ethyl.

Mononuclear chromium complexes suitable for use in the present invention can be prepared by known methods. For example bis (pentamethylcyclopentadienyl) chromium (II) can be prepared by reacting a substituted cyclopentadiene, e.g., potassium pentamethyl cyclopentadiene, with chromous (or chromic) chloride in the presence of tetrahydrofuran. Any novel complexes embraced by the above formula can be prepared by methods analogous to the known methods for producing such complexes.

The best catalysts for producing the polymers with the above-mentioned desired combination of melt index, melt flow ratio and molecular weight distribution are characterised in that the mononuclear chromium complex is representable by the above-mentioned formula wherein:
the cyclopentadienyl ligand is substituted by the five groups R1 to R5 selected from the group consisting of methyl, ethyl, isopropyl and n-propyl,
x is equal to 1 or 2, and L is a cyclopentadienyl ligand substituted with five groups individually selected from methyl, ethyl, isopropyl and n-propyl.

The most preferred mononuclear chromium complex used for preparing the catalyst is bis(pentamethylcyclopentadienyl) chromium (II).

In situ preparation of the catalyst precursors in which the mononuclear chromium complex is formed in solution and deposited directly onto the inorganic oxide support advantageously reduces the number of process steps required to prepare the catalyst.

Any suitable inorganic oxide can be used to support the mononuclear chromium complex including, for example, silica, alumina, silica-alumina mixtures, thoria, zirconia, magnesia, titania and mixtures thereof. Preferably, the inorganic oxide comprises a major amount of silica. More preferably, the inorganic oxide comprises at least 80% by weight of silica.

The particle size of the inorganic oxide support is not considered to be particularly critical, but the inorganic oxide preferably has a relatively high surface area. The surface area of the inorganic oxide is preferably greater than 20 $m^2 g^{-1}$, more preferably from 50 to 1000 $m^2 g^{-1}$.

The mononuclear chromium complexes are sensitive to moisture and so the inorganic oxide used to support the complex should be dry. The inorganic oxide can be dried simply by heating the oxide in a dry, inert atmosphere. The drying may be carried out at any temperature up to the temperature at which the oxide begins to sinter for a period of time which is at least sufficient to remove the physically adsorbed water. Typically, the drying may be carried out at a temperature of from 200° to 1000° C. for a period of from 6 to 36 hours. Preferably, the temperature used is at least 300° C., more preferably at least 500° C., but is preferably less than 900° C. A suitable inert atmosphere can be provided, for example by carrying out the heating under a blanket of an inert gas such as nitrogen or argon. Preferably, the inert gas is passed through the inorganic oxide during the drying to assist in displacing the water.

The melt index of the polymer produced using the supported catalyst may be affected by the selection of the type and grade of inorganic oxide. The temperature at which the inorganic oxide is dried may have an effect on the relative productivity of the catalyst system and on the molecular weight distribution and melt index of the polymer produced.

The mononuclear chromium complex may be deposited on the dry inorganic oxide using known techniques for the preparation of catalyst precursors. For example, a slurry technique can be used in which the inorganic oxide is contacted with a solution of the complex under conditions which exclude air and water. The slurry can be stirred for a period of time sufficient to achieve good adsorption of the mononuclear chromium complex on the inorganic oxide support e.g. up to about 4 hours. Any suitable dry solvent may be used such as for example petroleum ether.

The catalyst precursor may be used in the form of a slurry or paste. However, the solvent is preferably removed, e.g. by filtration or evaporation in a dry, inert atmosphere to produce a dry free-flowing powder.

Direct vapour deposition may also be used in some cases to deposit the mononuclear chromium complex on the inorganic oxide. This may conveniently be carried out by blending the complex and the inorganic oxide in a dry, inert atmosphere and then reducing the pressure to cause the mononuclear chromium complex to sublime and absorb onto the inorganic oxide support.

Typically, the amount of the mononuclear chromium complex deposited on the inorganic oxide support is such that the amount of chromium is from 0.01 to 10% by weight of the total weight of the complex and inorganic oxide. Preferably, the catalyst precursor contains from 0.1 to 5% more preferably from 1 to 3% by weight of chromium. Mixtures of mononuclear chromium complexes having the above general formula can be deposited simultaneously or sequentially onto the inorganic oxide support.

Before using the catalyst precursor in a polymerisation process, it is thermally activated. The thermal activation comprises heating the catalyst precursor at a temperature of at least 100° C. but preferably less than 700° C. for a period of at least 5 mins, preferably 10 mins to 24 hours. Preferably, the activation is carried out at a temperature of from 100° to 350° C. The thermal activation should be carried out in a dry, inert atmosphere, more particularly in a non-oxidizing atmosphere, free from moisture and oxygen, e.g., under nitrogen, argon or vacuum. The catalyst thus obtained has a chromium content similar to that of the catalyst precursor.

The present invention includes a catalyst precursor for forming a catalyst as described above which comprises a dry inorganic oxide support on which is deposited a mononuclear chromium complex having the above general formula in an amount such that the chromium content can be from 0.01 to 10% preferably from 0.1 to 5%, more preferably from 1 to 3% by weight based on the total weight of the complex and inorganic oxide. The precursor must be thermally activated to form the catalyst according to the present invention.

The present invention also includes a process for the production of polyolefins, in particular homopolymers of ethylene and copolymers of ethylene with minor amounts of at least one $C_3$ to $C_8$ alpha-olefin, which process comprises contacting the monomer or monomers, optionally in the presence of hydrogen, with an olefin polymerisation catalyst according to the present invention and as hereinbefore defined at a temperature and pressure sufficient to initiate the polymerisation reaction. The polymers or copolymers of ethylene thus obtained generally have a high density from 950 to 970 $kg/m^3$ and the $C_3$ to $C_8$ alpha-olefin content in the copolymers of ethylene can be about from 0.01% to 5% by weight.

The supported olefin polymerisation catalysts according to the present invention may optionally be used in the presence of one or more organo metallic co-catalyst compounds having a metal belonging to the Groups I to III of the Periodic Table of the elements, the metal being selected e.g. amongst lithium, aluminium, magnesium, zinc and boron. Such co-catalysts are known for use in the polymerisation of olefins and particularly include organo-aluminium compounds, for example, trimethylaluminium, triethylaluminium, diethylaluminium hydride, triisobutyl aluminium, tridecylaluminium, tridodecylaluminium, diethylaluminium methoxide, diethylaluminium ethoxide, diethylaluminium phenoxide, diethyl aluminium chloride, ethyl aluminium dichloride and methyl diethoxy aluminium. The co-catalyst can be deposited on the supported catalyst before, during or after the addition of the mononuclear chromium complex or can be added to the polymerisation medium along with the catalyst. Preferably the amount of co-catalyst used is up to 1000 mols of metal per mol of chromium in the mononuclear chromium complex of the supported catalyst. More preferably the amount of co-catalyst used is less than 100 most preferably less than 10 mols of metal per mol of chromium.

The olefin polymerisation catalyst according to the present invention can be used to produce polymers using solution polymerisation, slurry polymerisation or gas phase polymerisation techniques. Methods and apparatus for effecting such polymerisation reactions are well known. The catalyst according to the present invention can be used in similar amounts and under similar conditions to known olefin polymerisation catalysts such as for example the chromocene catalysts or supported chromium oxide catalysts.

The polymerisation is effected by contacting the monomer(s) with a catalytically effective amount of the olefin polymerisation catalyst according to the present invention, in the substantial absence of catalyst poisons, optionally in the presence of hydrogen at a temperature and pressure which are sufficient to initiate polymerisation.

Typically, the temperature is from 30° to 110° C. for the conventional slurry or "particle form" process and the gas phase process. For the solution process the temperature is typically from 100° to 200° C. The pressure used can be selected from a relatively wide range of suitable pressures e.g. from subatmospheric to about 350 MPa (50,000 psi). Generally, the pressure is from atmospheric up to about 6.9 MPa, preferably from 0.14 to 5.5 MPa.

The invention also includes polymers obtainable by a process using a catalyst according to the present invention.

METHOD FOR MEASURING THE MOLECULAR WEIGHT DISTRIBUTION

The molecular weight distribution of a (co)polymer is calculated according to the ratio of the weight-average molecular weight, Mw, to the number-average molecular weight, Mn, of the (co)polymer, from a molecular weight distribution curve obtained by means of a "WATERS" (trademark) model "150C" gel permeation chromatograph (High Temperature Size Exclusion Chromatograph) the operating conditions being the following:

solvent: 1,2,4-trichlorobenzene
solvent flow rate: 1.0 ml.minute
three "SHODEX" (trademark) model "AT80MS" columns of 25 cm of length are employed
temperature: 145° C.
sample concentration: 0.1% by weight
injection volume: 500 microlitres
universal standardization using monodispersed polystyrene fractions.

The invention is illustrated by the following example and comparative examples. In the Examples, the catalysts were prepared and stored under conditions which excluded air and water.

EXAMPLE 1

Catalyst Precursor Preparation

A slurry of potassium pentamethylcyclopentadienyl [KC$_5$(CH$_3$)$_5$](16 mmol based on C$_5$(CH$_3$)$_5$H used) was prepared in tetrahydrofuran (25 cm$^3$). CrCl$_2$(0.89 g, 7.25 mmol) was added to this slurry. The mixture was refluxed for 3 hours and then the tetrahydrofuran was removed under vacuum. The material was sublimed (10 Pa) at 170° C. on to a water-cooled probe. A brown crystalline solid of bis (pentamethylcyclopentadienyl) chromium (II) [Cr(C$_5$(CH$_3$)$_5$)$_2$] was isolated (1.05 g, 45% yield).

A commercially available silica sold by Joseph Crosfield and Sons Ltd under the trade designation EP10 was dehydrated at 150° C. in a vacuum oven. The silica was then heated at a temperature of 800° C. for 24 hours in an oven through which was passed a stream of dry nitrogen. The silica had a surface area of about 280 m$^2$/g. 10 g of the heat treated silica was placed in a 3-necked round bottomed flask, still under an atmosphere of dry nitrogen. 1.2 g of the bis (pentamethylcyclopentadienyl) chromium (II) was dissolved in 40 cm$^3$ of dichloromethane. The solution was introduced into the three-necked flask using a syringe. The slurry was stirred and the solvent removed under vacuum to produce free flowing particles. The catalyst precursor contained approximately 2% by weight of chromium.

Catalyst Activation 2 g of the catalyst precursor produced as described above was placed in a 100 cm$^3$ reaction flask under a dry nitrogen atmosphere. The flask was immersed in an oil bath maintained at 200° C., the catalyst being continuously stirred. Vacuum was then applied to the flask which remained in the oil bath for 30 minutes. The flask was removed from the oil bath and allowed to cool to room temperature (approximately 18° C.) under an atmosphere of dry nitrogen. The catalyst contained approximately 2% by weigh of chromium.

Polymerisation of Ethylene

Ethylene was homopolymerised in a 2.3 litre stainless steel reactor by contacting the monomer with 0.5 g of the catalyst in 1.0 litre of isobutane at 90° C. under a total pressure of 4.1 MPa for approximately one hour. The hydrogen pressure used was about 0.1 MPa.

COMPARATIVE EXAMPLE A

Example 1 was repeated except that the catalyst precursor was not subjected to activation by heating at 200° C.

COMPARATIVE EXAMPLE B

Example 1 was repeated except that the chromium complex deposited on the silica support was bis (cyclopentadienyl) chromium (II). The catalyst contained approximately 1.5% by weight of chromium.

COMPARATIVE EXAMPLE C

Example B was repeated except that the catalyst precursor was not subjected to activation by heating at 200° C.

The properties of the polymers produced in Example 1 and Comparative Examples A, B and C are given in the Table.

Comparative Example A shows that the chromium complex of Example 1 must be activated before it will catalyse the polymerisation of ethylene.

Comparative Examples B and C show that bis (cyclopentadienyl) chromium (II) has a high activity whether or not the catalyst is activated by heating. In both experiments the catalyst activity was so high that it was difficult to control the polymerisation reaction.

The omission of heating activation (Comparative Example A) in the preparation of the catalyst of the present invention gives a result completely different from that with a monochromium catalyst having unsubstituted cyclopentadienyl ligands, e.g. bis(cyclopentadienyl) chromium (II) (Comparative Example C).

The melt index and melt flow ratio of the polymer produced in Comparative Example C were lower than the values for the polymer produced in Comparative Example B. However, the polymer produced in Example 1 was very different from either of the polymers produced in these Comparative Examples in that it had a very much lower melt index and a much higher melt flow ratio. The polymer of Example 1 also had a very broad molecular weight distribution which is substantially higher than the value usually expected for an ethylene polymer of the specified melt flow ratio.

deposited on the inorganic oxide support is from 0.01 to 10% by weight of the total weight of the complex and inorganic oxide.

5. An olefin polymerization catalyst as claimed in claim 1 or claim 2 in which the dry inorganic support on which the mononuclear chromium complex is deposited is thermally activated by heating at a temperature of at least 100° C. but less than 350° C. in a dry, inert atmosphere.

6. A catalyst precursor for forming a catalyst as claimed in claim 1 comprising a dry inorganic oxide support on which is deposited a mononuclear chromium complex representable by the general formula;

TABLE

| Example | Catalyst | Cr Content (wt %) | Catalyst Activation Temp. (°C.) | Catalyst Activity (g/g/h) | Melt Index⁻ (dg/min) | Melt Flow Ratio⁻⁻ | Density (kg/m³) | Kd* | Molecular Weight Distribn. (Mw/Mn) | Vinyl groups per 1000 carbon atoms |
|---|---|---|---|---|---|---|---|---|---|---|
| 1 | [Cr(C₅(CH₃)₅)₂] | 2 | 200 | 525 | 0.1 | 79 | 961 | 4.1 | 13.3 | 0.2 |
| A | (as above) | 2 | Not Activated | 0 | — | — | — | — | — | — |
| B | [Cr(C₅H₅)₂] | 1.5 | 200 | High | 127 | 35 | 965 | — | 3.5 | 0.1 |
| C | (as above) | 1.5 | Not Activated | High | 84 | 28 | 962 | — | — | — |

*Kd is the rheological polydispersity index as defined by R Sabia in J. Appl. Polm. Sci. 7, 347-355 (January 1963)
⁻ ASTM D 1238 Condition E
⁻⁻ Melt Index according to ASTM D 1238 (Condition F)
Melt Index according to ASTM D 1238 (Condition E)

I claim:

1. An olefin polymerization catalyst obtainable by depositing on a dry inorganic oxide support a mononuclear chromium complex to produce a catalyst precursor and thereafter thermally activating the said catalyst precursor, characterised in that the mononuclear chromium complex is representable by the general formula:

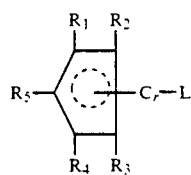

wherein
four of the groups $R_1$ to $R_5$ of the substituted cyclopentadienyl ligand are individually selected from the group consisting of methyl, ethyl, isopropyl and n-propyl and the fifth is selected from the group consisting of methyl, ethyl, n-propyl, isopropyl and hydrogen,
L is (a) a cyclopentadienyl ligand substituted with four or five groups individually selected from methyl, ethyl, isopropyl and n-propyl or (b) (CO)₃R in which R is H, methyl or ethyl.

2. An olefin polymerization catalyst as claimed in claim 1 in which the mononuclear chromium complex is bis (pentamethylcyclopentadienyl) chromium (II).

3. An olefin polymerization catalyst as claimed in claim 1 or claim 2 in which the inorganic oxide comprises a major amount of silica.

4. An olefin polymerization catalyst as claimed in claim 1 or claim 2 in which the amount of chromium

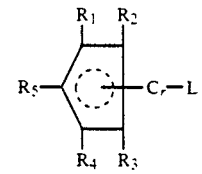

wherein
four of the groups $R_1$ to $R_5$ of the substituted cyclopentadienyl ligand are individually selected from the group consisting of methyl, ethyl, isopropyl and n-propyl and the fifth is selected from the group consisting of methyl, ethyl, isopropyl, n-propyl and hydrogen,
L is (a) a cyclopentadienyl ligand substituted with four or five groups individually selected from methyl, ethyl, isopropyl and n-propyl or (b) (CO)₃ R in which R is H, methyl or ethyl.

7. A catalyst precursor as claimed in claim 6 in which the chromium content is from 0.01 to 10% by weight based on the total weight of the complex and inorganic oxide.

8. An olefin polymerization catalyst as claimed in claim 2 wherein the inorganic oxide comprises a major amount of silica, the amount of chromium deposited on the inorganic oxide support is from 0.01 to 10% by weight of the total weight of the complex and inorganic oxide, and the catalyst precursor is thermally activated by heating at a temperature of at least 100° C. but less than 350° C. in a dry inert atmosphere.

9. A catalyst precursor as claimed in claim 7 in which the inorganic oxide comprises a major amount of silica and the amount of chromium deposited on the inorganic oxide support is from 0.01° to 10° by weight of the total weight of the complex and inorganic oxide.

* * * * *

UNITED STATES PATENT AND TRADEMARK OFFICE
CERTIFICATE OF CORRECTION

PATENT NO. : 5,169,815
DATED : December 8, 1992
INVENTOR(S) : Gordon M. Dawkins

It is certified that error appears in the above-indentified patent and that said Letters Patent is hereby corrected as shown below:

Column 2, line 1, should read "950 to 97$\underline{0}$ kg/m$^3$)"
Column 2, line 44, should read "and hydr$\overline{o}$gen, and"
Column 4, line 22, there should be a comma (,) after e.g.$\underline{,}$
Column 6, line 32, correct the spelling of the word "weig$\underline{ht}$"
Column 7, claim 1, line 19, after "hydrogen", insert --and--
Column 8, claim 6, line 4, after "formula" change the semicolon to a colon (:)
Column 8, claim 6, line 42, after "hydrogen", insert --and--

Signed and Sealed this

Ninth Day of November, 1993

Attest:

BRUCE LEHMAN

Attesting Officer    Commissioner of Patents and Trademarks